(12) United States Patent
Sundararajan et al.

(10) Patent No.: US 12,422,970 B2
(45) Date of Patent: Sep. 23, 2025

(54) SYSTEM AND METHOD FOR ENABLING DYNAMIC REGROUPING OF ICONS ON A GUI WITHOUT REQUIRING RECONFIGURATION

(71) Applicant: AppviewX Inc, New York, NY (US)

(72) Inventors: Indhuja Sundararajan, Coimbatore (IN); Gowthamkumar Shanmugam, Tiruppur (IN); Narmadha Ramaswamy, Coimbatore (IN); Kotilinga Reddy Bhavanam, Bengaluru (IN)

(73) Assignee: AB PRIVATE CREDIT INVESTORS LLC, Austin, TX (US)

( * ) Notice: Subject to any disclaimer, the term of this patent is extended or adjusted under 35 U.S.C. 154(b) by 171 days.

(21) Appl. No.: 18/392,090

(22) Filed: Dec. 21, 2023

(65) Prior Publication Data
US 2024/0211095 A1    Jun. 27, 2024

Related U.S. Application Data

(60) Provisional application No. 63/435,161, filed on Dec. 23, 2022.

(51) Int. Cl.
G06F 3/048      (2013.01)
G06F 3/04817    (2022.01)

(52) U.S. Cl.
CPC ................................ *G06F 3/04817* (2013.01)

(58) Field of Classification Search
None
See application file for complete search history.

(56) References Cited

U.S. PATENT DOCUMENTS

| | | | |
|---|---|---|---|
| 12,367,017 B2 * | 7/2025 | Huang | G06Q 30/0276 |
| 2018/0081501 A1 * | 3/2018 | Johnston | H04L 67/025 |
| 2018/0144016 A1 * | 5/2018 | Bestfleisch | G06F 11/1451 |
| 2023/0396629 A1 * | 12/2023 | Vigna | H04L 9/0872 |
| 2024/0362042 A1 * | 10/2024 | Zhou | G06F 9/452 |

* cited by examiner

*Primary Examiner* — Thanh T Vu

(57) ABSTRACT

Embodiments herein provide a method for enabling dynamic regrouping of icons on a graphical user interface without requiring a reconfiguration. The method includes (i) enabling creation of a plurality of application widgets within an application dashboard that representing organized and real-time information associated with applications objects, (ii) automatically associating a resource with each application widget based on at least one of a selection of the application objects, a grouping template, user permissions and application object properties during creation of a plurality of application widgets, (iii) automatically detecting at least one changed application object based on at least one of a manual discovery cycle, a syslog message, a SNMP trap, or a notification from a user device, (iv) automatically adding, the at least one changed application object to corresponding widget by validating, in real time, and (v) dynamically re-grouping the application objects within the updated widgets according to the grouping template associated with each of the plurality of application widgets.

15 Claims, 16 Drawing Sheets

Add Objects

Widget 1

HRAppServers

Object: | V11WIP.COM/F5_V11_Standalone_1/absecon/F5 | Www.sdetdashboardothergslbfqdnhierarchytest.com/a10_AutoDevice_1/A10 | test Create option "test"

Www.sdetdashboardothergslbfqdnhierarchytest.com/a10_AutoDevice_1/A10

Www.sdetdashboardothergslbfqdndisabletest.com/a10_AutoDevice_1/A10

Www.sdetdashboardothergslbfqdnenabletest.com/a10_AutoDevice_1/A10

*Each widget can hold maximum of 1000 objects*

Dashboard Allocation

Dashboard *
● New  ○ Existing

Name *

HRApps

Create    Cancel

FIG. 6B

APPLICATION LAYOUT

Object type ⓘ

GSLB Applications

Select Object Grouping Format ⓘ

✓ DATACENTER VIEW ⓘ

DATA CENTER 01

GSLB_1
Pool
Pool Member

DATA CENTER 02

GSLB_2
Pool
Pool Member

✓ DEVICE VIEW ⓘ

DEVICE NAME 01

GSLB_1
Pool
Pool Member

DEVICE NAME 02

GSLB_2
Pool
Pool Member

FIG. 7A

Application view :: netAppWidget ↻ 329 Min ago ⋮

☐◉ absecon  〉

Object Count (12)

- ◉☐ Ecomm.App3.com/192.168.40.152/absecon/F5 《
- ◉☐ QAGTMPool/192.168.40.152/absecon/F5
  - ■☐ /Common/DC_vs/12.4.4.4:80/192.168.41.152/QAGTMPool/192.168.40.152/absecon/F5
- ◉■ GTMWip001.com/192.168.40.152/absecon/F5 《
- ◉☐ TESTGTMWip001.com/192.168.40.152/absecon/F5 《
- ◉☐ monitor_validation/192.168.40.152/absecon/F5
  - ■☐ vs_192_168_55_251_443/192.168.55.251:443/192_168_55_251/monitor_validation/192.168.40.152/absecon/F5
  - ■☐ vs_192_168_42_43_5004/192.168.42.43:5004/192_168_42_43/monitor_validation/192.168.40.152/absecon/F5
  - ■☐ vs_10_10_102_120_5004/10.10.102.120:5004/10_10_102_120/monitor_validation/192.168.40.152/absecon/F5
  - ■☐ vs_192_168_40_152_443/192.168.40.152:443/192_168_40_152/monitor_validation/192.168.40.152/absecon/F5
- ◉☐ Test/GTM01Pool/192.168.40.152/absecon/F5 《
- ◉☐ test/5.55.5:80/test-bigip/TestGTM01Pool/192.168.40.152/absecon/F5

☐◉ virginia  〉

Object Count (9)

- ◉☐ BackUpIPV4WithSGM-4086OTGSLBVSAJPV4.com/192.168.40.85/Citrix 《
- ◉☐ BackUpIPV4WithSGM_4086_OT_GSLB_Service_001/112.153.163.100:80/BackUpIPV4WithSGM-4086OTGSLBVSAIPV4.com/192.168.40.85/Citrix 《
  - ◉■ 112.153.163.100/112.153.163.100/192.168.40.85/Citrix
- ◉☐ BackUpIPV4WithService-4086OTGSLBVSAJPV4.com/192.168.40.85/Citrix 《
- ◉☐ BackUpIPV4WithService_4086_OT_GSLB_Service_001/112.153.163.100:80/BackUpIPV4WithService-4086OTGSLBVSAIPV4.com/192.168.40.85/Citrix
  - ◉■ 112.153.163.100/112.153.163.100/192.168.40.85/Citrix
- ◉☐ BackUpIPV6WithCSVSSGM-4086OTGSLBVSAAAAJPV6.com/192.168.40.85/Citrix 《
- ◉☐ BackUpIPV6WithCSVSSGM_4086_OT_GSLB_Service_001/eeff:1991:abcd:0:f112:f153:f161:f100:90/BackUpIPV6WithCSVSSGM-4086OTGSLBVSAIPV6.com/192.168.40.85/Citrix
  - ◉■ eeff:1991:abcd:0:f112:f153:f161:f100/eeff:1991:abcd:0:f112:f153:f161:f100/192.168/40.85/Citrix

FIG. 8

Application view :: netAppWidget                                    ↻ 330 Min ago ⋮

☐◉ 198.162.40.152                                                                   ⌄

Object Count (12)

◉☐ Ecomm.App3.com/192.168.40.152/absecon/F5                                        ≪
◉☐ QAGTMPool/192.168.40.152/absecon/F5                                             ≪
　◉■ /Common/DC_vs/12.4.4.4:80/192.168.41.152/QAGTMPool/192.168.40.152/absecon/F5
◉■ GTMWip001.com/192.168.40.152/absecon/F5                                         ≪
◉■ TESTGTMWip001.com/192.168.40.152/absecon/F5                                     ≪
◉☐ monitor_validation/192.168.40.152/absecon/F5                                    ≪
　◉☐ vs_192_168_55_251_443/192.168.55.251:443/192_168_55_251/monitor_validation/F5
　◉☐ vs_192_168_42_43_5004/192.168.42.43:5004/192_168_42_43/monitor_validation/F5
　◉● vs_10_10_102_120_5004/10.10.102.120:5004/10_10_102_120/monitor_validation/F5
　◉☐ vs_192_168_40_152_443/192.168.40.152:443/192_168_40_152/monitor_validation/F5
◉● Test/GTM01Pool/192.168.40.152/absecon/F5                                        ≪
　◉☐ test/5.5.5.5:80/test-bigip/TestGTM01Pool/192.168.40.152/absecon/F5

☐◉198.162.40.85                                                                     ⌄

Object Count (9)

◉☐ BackUpIPV4WithSGM-4086OTGSLBVSAJPV4.com/192.168.40.85/Citrix                    ≪
◉☐ BackUpIPV4WithSGM_4086_OT_GSLB_Service_001/112.153.163.100:80/BackUpIPV4WithService-4086OTGSLBVSAIPV4.com/192.168.40.85/Citrix  ≪
　◉■ 112.153.163.100/112.153.163.100/192.168.40.85/Citrix
◉☐ BackUpIPV4WithService-4086OTGSLBVSAJPV4.com/192.168.40.85/Citrix                ≪
◉☐ BackUpIPV4WithService_4086_OT_GSLB_Service_001/112.153.163.100:80/BackUpIPV4WithService-4086OTGSLBVSAIPV4.com/192.168.40.85/Citrix
　◉■ 112.153.163.100/112.153.163.100/192.168.40.85/Citrix
◉☐ BackUpIPV6WithCSVSSGM-4086OTGSLBVSAAAAJPV6.com/192.168.40.85/Citrix             ≪
◉☐ BackUpIPV6WithCSVSSGM_4086_OT_GSLB_Service_001/eeff:1991:abcd:0:f112:f153:f100.90/BackUpIPV6WithCSVSSGM-4086OTGSLBVSAIPV6.com/
192.168.40.85/Citrix
　◉■ eeff:1991:abcd:0:f112:f153:f161:f100/eeff:1991:abcd:0:f112:f153:f161:f100/192.168.40.85/Citrix

FIG. 9C

ADD/MODIFY OBJECTS

* Vendor: AVI
* Device State: Active
* Device Name: All
* Object Type: Server
* Hierarchy: Server Only Available Objects Search                                                              ⓘ   Add as Regex  > absecon

All 68 objects in page are selected. Clear selection

✓ Select All
✓ 1.1.1.1/1.1.1.1:80/1999.avi_v20_ha/absecon/AVI
✓ 12.11.11.12/12.11.11.12:80/test2-pool/avi_v20_ha/absecon/AVI
✓ 12.2.2.10/12.2.2.2.10:80/vs-server-modify-pool/avi_v20_ha/absecon/AVI
✓ 12.2.2.2/12.2.2.2:80/vs-server-modify-pool/avi_v20_ha/absecon/AVI
✓ 12.2.2.3/12.2.2.3:80/vs-server-modify-pool/avi_v20_ha/absecon/AVI
0 to 25 of 68   <   >

Save

FIG. 9D

SYSTEM AND METHOD FOR ENABLING DYNAMIC REGROUPING OF ICONS ON A GUI WITHOUT REQUIRING RECONFIGURATION

BACKGROUND

Technical Field

The embodiments herein relate to the field of network management, and more specifically to a system and method for enabling dynamic regrouping of icons on a GUI without requiring reconfiguration.

Description of the Related Art

In a typical organizational setup, the deployment of a multitude of applications is commonplace. It is paramount to effectively visualize and manage all objects specific to each application. To facilitate the management of these diverse applications, users must categorize application-specific objects based on business requirements. Widgets are then tailored to these specific needs and assigned to corresponding operators. Administrators configure dashboards based on the identified application-specific objects, and these are subsequently allocated to operators for the comprehensive monitoring and management of the corresponding application-specific elements.

In other words, conventional dashboards are inherently static. However, contemporary applications exhibit dynamic, elastic characteristics, adjusting their scale in response to conditions such as user traffic and various parameters. The conventional approach, consolidating thousands of application-specific objects under a single widget, proves inadequate. A more effective strategy involves grouping and visualizing application-specific objects on the dashboard according to business requirements, thereby enabling their efficient management. The existing solutions demand significant resources for dashboard reconfigurations and operator allocations, coupled with a considerable time investment.

FIG. 1 illustrates an exemplary block diagram of application management system according to a prior art. The application specific devices/objects are assigned under widgets 102A-N. The widgets 102A-N are assigned to the operators 104A-N. Currently, application administrators create application widgets and assign to the operators for managing the assigned applications as shown in FIG. 1. When new applications are provisioned, the application administrators have to re-configure all application widgets. Most of the time the administrators have new application widgets with newly provisioned application objects. Even if the grouping property of the application gets changed, they have to reconfigure the widget.

Accordingly, there remains a need for a system and method for managing the application-specific objects.

SUMMARY

In view of the foregoing, embodiments herein provide a processor-implemented for enabling dynamic regrouping of icons on a graphical user interface without requiring a reconfiguration. The method includes (i) enabling creation of a plurality of application widgets within an application dashboard, wherein the application dashboard is a visual interface representing organized and real-time information associated with applications objects, wherein the plurality of application widgets are modular graphical components within the application dashboard for displaying data associated with the application objects, (ii) automatically associating a resource with each of the plurality of application widgets based on a user input that is received during the creation of the plurality of application widgets, wherein the resource comprises a predefined grouping of the application objects, wherein the user input comprise at least one of (a) a selection of the application objects, (b) a grouping template, (c) user permissions or (d) properties of the application objects, (iii) automatically detecting by a processor at least one changed application object based on at least one of (a) a manual discovery cycle or a periodic discovery cycle, (b) a syslog message, (c) a simple network management protocol (SNMP) trap, or (d) a notification from a user device, (iv) automatically adding, by a processor, the at least one changed application object to corresponding widget by validating, in real time, the at least one changed application object against a predefined condition and a filter associated with each of the plurality of application widgets to obtain updated widgets, (v) dynamically re-grouping the application objects within the updated widgets according to the grouping template associated with each of the plurality of application widgets.

The method is of advantage that the method enables a reduction in computational complexity because of the application object being dynamically managed in the network. Traditionally, dynamic management of application objects requires continuous heavy computation as data quickly becomes obsolete; however, the method enables changing the widget grouping format by just changing the grouping template and without requiring reconfiguration of the widget. The method allows quick adjustment of the presentation of application widgets on the graphical user interface based on evolving requirements or preferences without undergoing a time-consuming reconfiguration process. The method streamlines the customization of the graphical user interface, thereby saving time and maintaining an ability to automatically respond promptly to changes in application structure or user needs.

Further, the method enables real-time validation of the changed application objects with corresponding widgets for obtaining updated widgets, which ensures that users see the most current and accurate information reflected in the widgets on the graphical user interface. Real-time validation helps maintain data integrity, reduces the risk of displaying outdated information, and allows for swift adaptation to changes in the application. The method is advantageous in a dynamic environment, where timely and accurate data presentation is crucial for decision-making and user interaction.

In some embodiments, the method further includes displaying the dynamically re-grouped application objects within the widget on the application dashboard. In some embodiments, the dynamic re-grouping accommodates changes in data or user requirements without requiring a redesign, providing flexibility in adapting to evolving situations. Users are enabled with quick access to relevant information by organizing and grouping of application objects in a way that corresponds with the workflow of the user, increasing overall efficiency. Further, the graphical user interface may be customized based on preferences or specific needs of the user, thereby enabling a personalized user experience.

In some embodiments, the method further includes the step of automatically adding the at least one changed application object to corresponding widget to obtain updated widgets includes matching a new application object with the regular expression and adding matching application objects to the widget. The automation reduces manual effort, streamlining the process of updating widgets, and is efficient when dealing with a large number of application objects. Automated matching ensures a consistent and standardized approach, minimizing the risk of human error in associating application objects with widgets. However, the automated process easily scales to handle additional or modified objects without requiring extensive manual adjustments.

In some embodiments, the predefined condition and the filter associated with each of the plurality of application widgets includes at least one of an application object vendor, a device type, a device status, and at least one application property. The users can quickly set up widgets without manually configuring conditions each time, saving time and effort in the widget creation process.

In some embodiments, the method further includes enabling an interactive modification of grouping template of the plurality of application widgets without requiring widget reconfiguration. Users may dynamically adjust the grouping of the widgets without the need for reconfiguration, saving time and effort.

In one aspect, a system for enabling dynamic regrouping of icons on a graphical user interface without requiring a reconfiguration is provided. The system includes a memory that stores a set of instructions and a processor that is configured to execute the set of instructions. The processor is configured to (i) enable creation of a plurality of application widgets within an application dashboard, wherein the application dashboard is a visual interface representing organized and real-time information associated with applications objects, wherein the plurality of application widgets are modular graphical components within the application dashboard for displaying data associated with the application objects, (ii) automatically associate a resource with each of the plurality of application the widgets based on a user input that is received during the creation of the plurality of application widgets, wherein the resource comprises a predefined grouping of the application objects, wherein the user input comprise at least one of (a) a selection of the application objects, (b) a grouping template, (c) user permissions and (d) properties of the application objects, (iii) automatically detect at least one changed application object based on at least one of (a) a manual discovery cycle or a periodic discovery cycle, (b) a syslog message, (c) a simple network management protocol (SNMP) trap, or (d) a notification from a user device, (iv) automatically add the at least one changed application object to corresponding widget by validating, in real time, the at least one changed application object against a predefined condition and a filter associated with each of the plurality of application widgets to obtain updated widgets, (v) dynamically re-group the application objects within the updated widgets according to the grouping template associated with each of the plurality of application widgets.

The system is of advantage that the system enables a reduction in computational complexity because of the application object being dynamically managed in the network. Traditionally, dynamic management of application objects requires continuous heavy computation as data quickly becomes obsolete; however, the system enables changing the widget grouping format by just changing the grouping template and without requiring reconfiguration of the widget. The system allows quick adjustment of the presentation of application widgets on the graphical user interface based on evolving requirements or preferences without undergoing a time-consuming reconfiguration process. The system streamlines the customization of the graphical user interface, thereby saving time and maintaining an ability to automatically respond promptly to changes in application structure or user needs.

Further, the system enables real-time validation of the changed application objects with corresponding widgets for obtaining updated widgets, which ensures that users see the most current and accurate information reflected in the widgets on the graphical user interface. Real-time validation helps maintain data integrity, reduces the risk of displaying outdated information, and allows for swift adaptation to changes in the application. The system is advantageous in a dynamic environment, where timely and accurate data presentation is crucial for decision-making and user interaction.

In some embodiments, the system further displays the dynamically re-grouped application objects within the widget on the application dashboard. In some embodiments, the dynamic re-grouping accommodates changes in data or user requirements without requiring a redesign, providing flexibility in adapting to evolving situations. Users are enabled with quick access to relevant information by organizing and grouping application objects in a way that corresponds with the workflow of the user, increasing overall efficiency. Further, the graphical user interface may be customized based on preferences or specific needs of the user, thereby enabling a personalized user experience.

In some embodiments, the processor automatically adds the at least one changed application object to corresponding widget to obtain updated widgets by matching a new application object with the regular expression and adding matching application objects to the widget. The automation reduces manual effort, streamlining the process of updating widgets, and is efficient when dealing with a large number of application objects. Automated matching ensures a consistent and standardized approach, minimizing the risk of human error in associating application objects with widgets. However, the automated process easily scales to handle additional or modified objects without requiring extensive manual adjustments.

In some embodiments, the predefined condition and the filter associated with each of the plurality of application widgets includes at least one of an application object vendor, a device type, a device status, or at least one application property. The users can quickly set up widgets without manually configuring conditions each time, saving time and effort in the widget creation process.

In some embodiments, the processor further enables an interactive modification of grouping template of the plurality of application widgets without requiring widget reconfiguration. Users may dynamically adjust grouping of the widgets without the need for reconfiguration, saving time and effort.

In another aspect, a non-transitory computer-readable storage medium storing a sequences of instructions, which when executed by one or more processors, causes enabling dynamic regrouping of icons on a graphical user interface without requiring a reconfiguration by (i) automatically associating a resource with each of the plurality of application widgets based on a user input that is received during the creation of the plurality of application widgets, wherein the resource comprises a predefined grouping of the application objects, wherein the user input comprise at least one of (a) a selection of the application objects, (b) a grouping template, (c) user permissions and (d) properties of the application objects, (ii) automatically associating a resource with each of the plurality of application widgets based on a user input that is received during the creation of the plurality of application widgets, wherein the resource comprises a predefined grouping of the application objects, wherein the user input comprise at least one of (a) a selection of the application objects, (b) a grouping template, (c) user permissions and (d) properties of the application objects, (iii) automatically detecting, by a processor, at least one changed application object based on at least one of (a) a manual discovery cycle or a periodic discovery cycle, (b) a syslog message, (c) a simple network management protocol (SNMP) trap, or (d) a notification from a user device, (iv) automatically adding, by the processor, the at least one changed application object to corresponding widget by validating, in real time, the at least one changed application object against a predefined condition and a filter associated with each of the plurality of application widgets to obtain updated widgets, and (v) dynamically re-grouping the application objects within the updated widgets according to the grouping template associated with each of the plurality of application widgets.

In some embodiments, the one or more non-transitory computer-readable storage mediums storing the one or more sequences of instructions, which when executed by the one or more processors further causes displaying the dynamically re-grouped application objects within the widget on the application dashboard.

In some embodiments, the step of automatically adding the at least one changed application object to corresponding widget to obtain updated widgets includes matching a new application object with the regular expression and adding matching application objects to the widget.

In some embodiments, the predefined condition and the filter associated with each of the plurality of application widgets includes at least one of an application object vendor, a device type, a device status, and at least one application property. In some embodiments, the one or more non-transitory computer-readable storage mediums storing the one or more sequences of instructions, which when executed by the one or more processors further causes enabling an interactive modification of the grouping template of the plurality of application widgets without requiring widget reconfiguration.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 6A and 6B illustrate user interfaces of selecting widget layout and adding applications manually to a selected widget respectively according to an embodiment herein;

FIGS. 7A and 7B illustrate user interfaces of adding widgets by tagging a resource according to an embodiment herein;

FIG. 8 illustrates a user interface of grouping application specific objects based on data centers according to an embodiment herein;

FIGS. 9A-9D illustrate user interfaces of changing template and grouping application specific objects according to an embodiment herein;

DETAILED DESCRIPTION OF PREFERRED EMBODIMENTS

Figure 1:
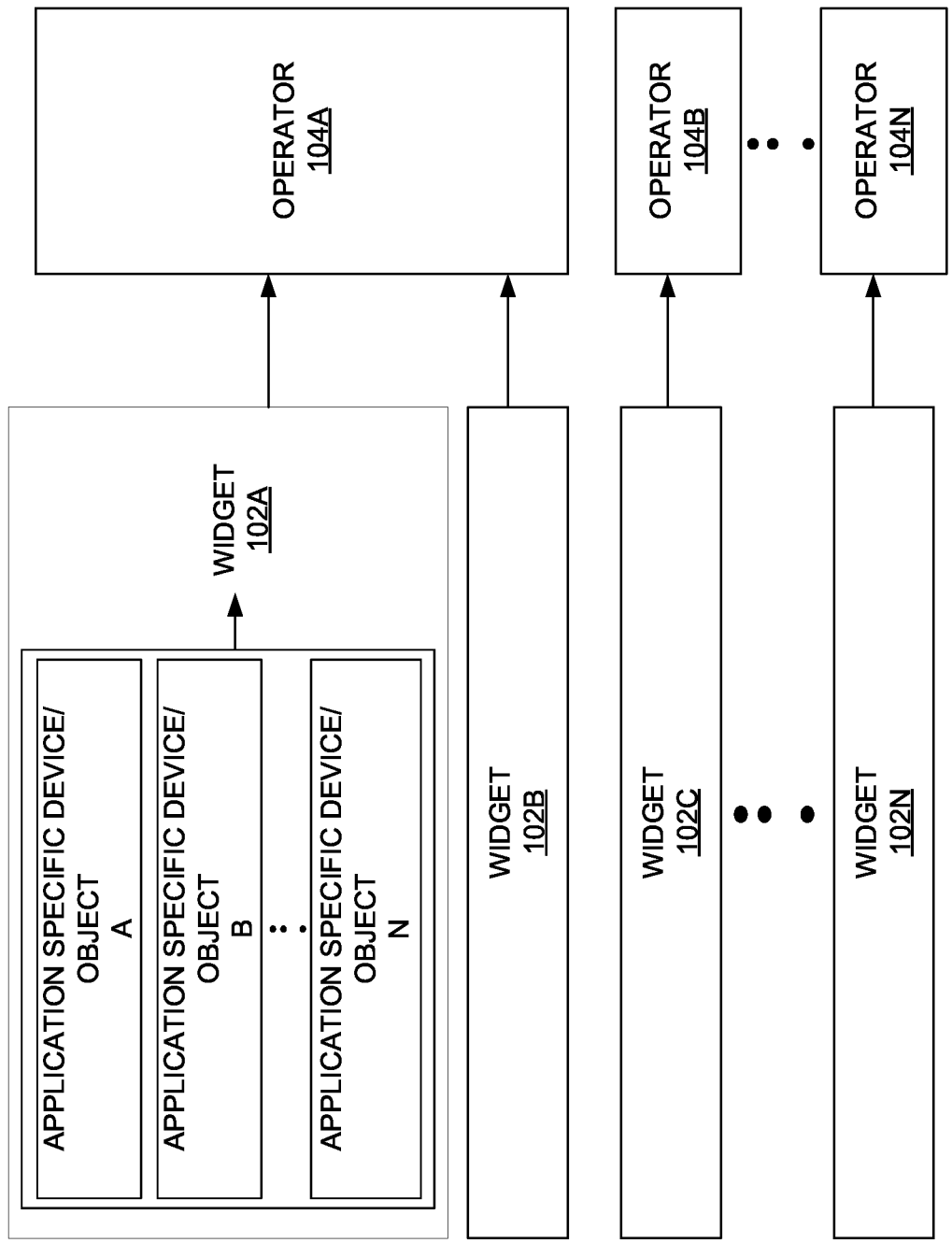
FIG. 1 illustrates an exemplary block diagram of application management system according to a prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for enabling dynamic regrouping of icons on a graphical user interface without requiring a reconfiguration. Referring now to the drawings, and more particularly to FIGS. 1 through 11, where similar reference characters denote corresponding features consistently throughout the figures, there are shown preferred embodiments.

The term "application widgets" refers to small, interactive elements that provide specific functions or information on a user interface. The plurality of application widgets can be placed on a home screen, dashboard, or within an application to offer quick access to certain features or display dynamic content. The plurality of application widgets are modular components in the application dashboard configured to display data associated with the application objects.

The term "application dashboard" refers to a user interface element that provides a visual representation of key information, data, or features within a software application. It serves as a centralized hub, often displaying summarized data, charts, graphs, and quick access to essential functionalities. The application dashboard is configured by administrators based on discovered application objects and is assigned to operators for monitoring and managing applications.

The term "application object" refers to a programmatically managed entity for effective orchestration and customization of a large number of applications. Application objects enable the creation of application widgets and seamlessly assign the application widgets to operators within a computational environment.

Figure 2:
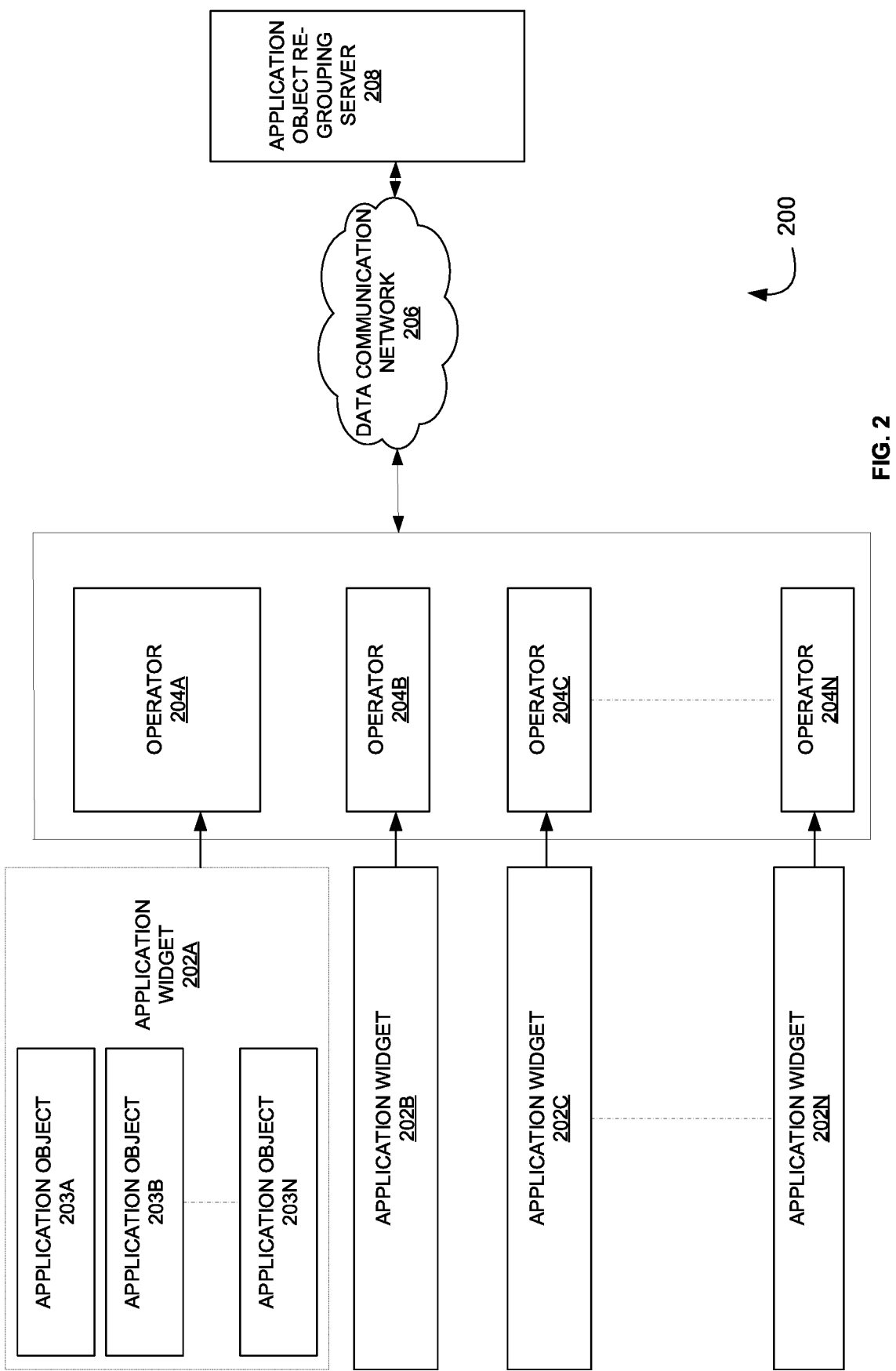
FIG. 2 illustrates an exemplary block diagram of a system for enabling dynamic regrouping of icons on a graphical user interface (GUI) without requiring a reconfiguration according to an embodiment herein.

FIG. 2 illustrates an exemplary block diagram of a system 200 for enabling dynamic regrouping of icons on a graphical user interface (GUI) without requiring a reconfiguration according to an embodiment herein. The system 200 includes one or more application widgets 202A-N associated with one or more application objects 203A-N. The one or more application widgets 202A-N are assigned to one or more operators 204A-N for managing application objects that are assigned to the one or more operators 204A-N. The one or more application widgets 202A-N associated with the one or more application objects 203A-N are communicatively connected to an application object re-grouping server 208 through a data communication network 206. In some embodiments, the data communication network 206 is a wired network. In some embodiments, the data communication network 206 is a combination of the wired network and the wireless network. In some embodiments, the data communication network 206 is the Internet.

The application object re-grouping server 208 is configured to enable creation of the one or more application widgets 202A-N within an application dashboard. The application dashboard is a visual interface representing organized and real-time information associated with the one or more applications objects 203A-N. The one or more application widgets 202A-N are modular graphical components within the application dashboard for displaying data associated with the one or more application objects 203A-N.

The application object re-grouping server 208 is configured to automatically associate a resource with each of the one or more application widgets 202A-N based on a user input that is received during the creation of the one or more application widgets 202A-N. The resource comprises a predefined grouping of the one or more application objects 203A-N. The user input includes one or more of (a) a selection of the one or more application objects 203A-N, (b) a grouping template, (c) user permissions, and (d) properties of the one or more application objects 203A-N.

The application object re-grouping server 208 comprises a processor that is configured to automatically detect one or more changed application objects based on one or more of (a) a manual discovery cycle or a periodic discovery cycle, (b) a syslog message, (c) a simple network management protocol (SNMP) trap, or (d) a notification from a user device. The application object re-grouping server 208 is configured to automatically add, by the processor, the one or more changed application objects to corresponding application widgets by validating, in real time, the one or more changed application objects against a predefined condition and a filter associated with each of the one or more application widgets 202A-N to obtain updated application widgets.

The application object re-grouping server 208 is configured to dynamically re-group the one or more application objects 203A-N within the updated widgets according to the grouping template associated with each of the one or more application widgets 202A-N. The system 200 is of advantage that the system 200 enables a reduction in computational complexity because of the one or more application objects 203A-N being dynamically managed. Traditionally, dynamic management of application objects requires continuous heavy computation as data quickly becomes obsolete. However, the system 200 enables changing the widget grouping format by just changing the grouping template and without requiring reconfiguration of the one or more application widgets 202A-N. The system 200 allows quick adjustment of presentation of the one or more application widgets 202A-N on the GUI based on evolving requirements or preferences without undergoing a time-consuming reconfiguration process. The system 200 streamlines the customization of the GUI, thereby saving time and maintaining an ability to respond to changes automatically and promptly in application structure or user needs.

Further, the system 200 enables real-time validation of the one or more changed application objects with corresponding application widgets for obtaining updated application widgets, which ensures that users see the most current and accurate information reflected in the widgets on the GUI. Real-time validation helps maintain data integrity, reduces the risk of displaying outdated information, and allows for swift adaptation to changes in the application. The system 200 is advantageous in a dynamic environment, where timely and accurate data presentation is crucial for decision-making and user interaction.

In some embodiments, the system 200 further displays the dynamically re-grouped application objects within the widget on the application dashboard. The dynamic re-grouping accommodates changes in data or user requirements without requiring a reconfiguration, providing flexibility in adapting to evolving situations. Users are enabled with quick access to relevant information by organizing and grouping of application objects in a way that corresponds with the workflow of the user, increasing overall efficiency. Further, the graphical user interface may be customized based on preferences or specific needs of the user, thereby enabling a personalized user experience.

In some embodiments, the system 200 automatically adds the one or more changed application objects to corresponding application widgets to obtain updated application widgets by matching a new application object with the regular expression and adding matching application objects to the widget. Automated matching ensures a consistent and standardized approach, minimizing the risk of human error in associating application objects with widgets. However, the automated process easily scales to handle additional or modified objects without requiring extensive manual adjustments.

In some embodiments, the predefined condition and the filter associated with each of the plurality of application widgets includes at least one of an application object vendor, a device type, a device status, and at least one application property. The users can quickly set up widgets without manually configuring conditions each time, saving time and effort in the widget creation process. In some embodiments, the system 200 enables an interactive modification of grouping template of the plurality of application widgets without requiring widget reconfiguration. Users may dynamically adjust grouping of the application widgets without the need for reconfiguration, saving time and effort.

Figure 3:
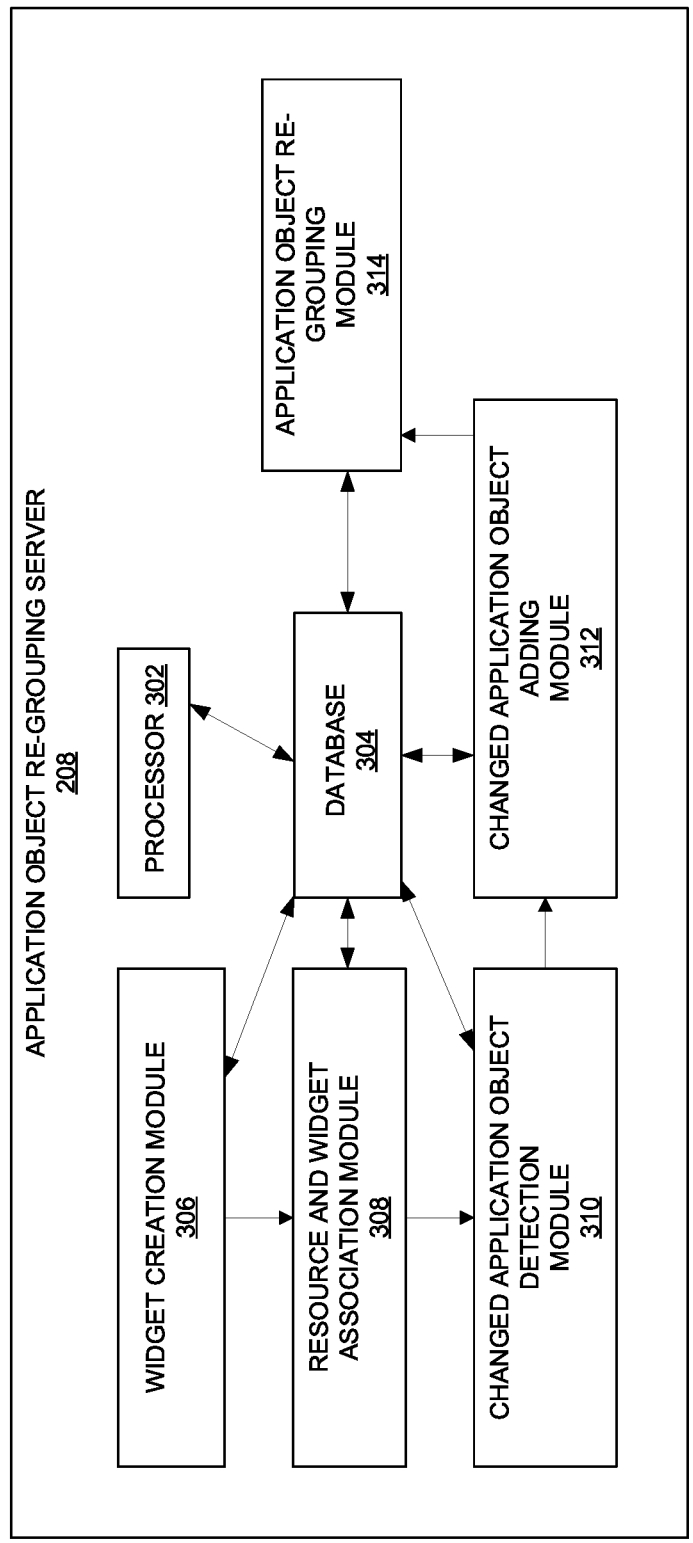
FIG. 3 illustrates an exploded view of an application object re-grouping server of FIG. 2 according to an embodiment herein.

FIG. 3 illustrates an exploded view of the application object re-grouping server 208 of FIG. 2 according to an embodiment herein. The application object re-grouping server 208 includes a processor 302, a database 304, a widget creation module 306, a resource and widget association module 308, a changed application object detection module 310, a changed application object adding module 312, and an application object re-grouping module 314. The processor 302 executes the widget creation module 306, the resource and widget association module 308, the changed application object detection module 310, the changed application object adding module 312, and the application object re-grouping module 314.

The widget creation module 306 enables creation of the one or more application widgets 202A-N within an application dashboard. The application dashboard is a visual interface representing organized and real-time information associated with the one or more application objects 203A-N. The one or more application widgets 202A-N are modular graphical components within the application dashboard for displaying data associated with the one or more application objects 203A-N. The resource and widget association module 308 is configured to automatically associate a resource with each of the one or more application widgets 202A-N based on a user input that is received during the creation of the one or more application widgets 202A-N. The resource comprises a predefined grouping of the one or more application objects 203A-N. The user input includes one or more of (a) a selection of the one or more application objects 203A-N, (b) a grouping template, (c) user permissions and (d) properties of the one or more application objects 203A-N.

The changed application object detection module 310 is configured to automatically detect, using the processor 302, one or more changed application objects based on one or more of (a) a manual discovery cycle or a periodic discovery cycle, (b) a syslog message, (c) a simple network management protocol (SNMP) trap, or (d) a notification from a user device. In some embodiments, the application specific objects are updated and added on the application widgets 202A-N based on the network conditions of an organization.

The changed application object adding module 312 is configured to automatically add, using the processor 302, the one or more changed application objects to corresponding application widgets by validating, in real time, the one or more changed application objects against a predefined condition and a filter associated with each of the one or more application widgets 202A-N to obtain updated application widgets. The application object re-grouping module 314 is configured to dynamically re-group the one or more application objects 203A-N within the updated widgets according to the grouping template associated with each of the one or more application widgets 202A-N.

Any management system includes at least one of a manual or a periodic discovery cycle to detect updates in existing application-specific objects. The management system discovers and manages newly provided application-specific objects. In some embodiments, syslog messages, SNMP traps, and notifications from devices are used to trigger discovery or configuration fetch operations. The application object re-grouping module 314 modifies and validates newly created application objects against configured application widgets. The application object re-grouping module 314 obtains all widgets to check widget conditions and filters the application-specific objects in each application widget. Based on conditions or filters of application widgets, application-specific objects are added to the application widget based on one or more conditions or filters of the one or more application widgets 202A-N. In some embodiments, the one or more application widgets 202A-N are re-grouped in order to group newly added application objects according to a template chosen for the application widget.

Figure 4:
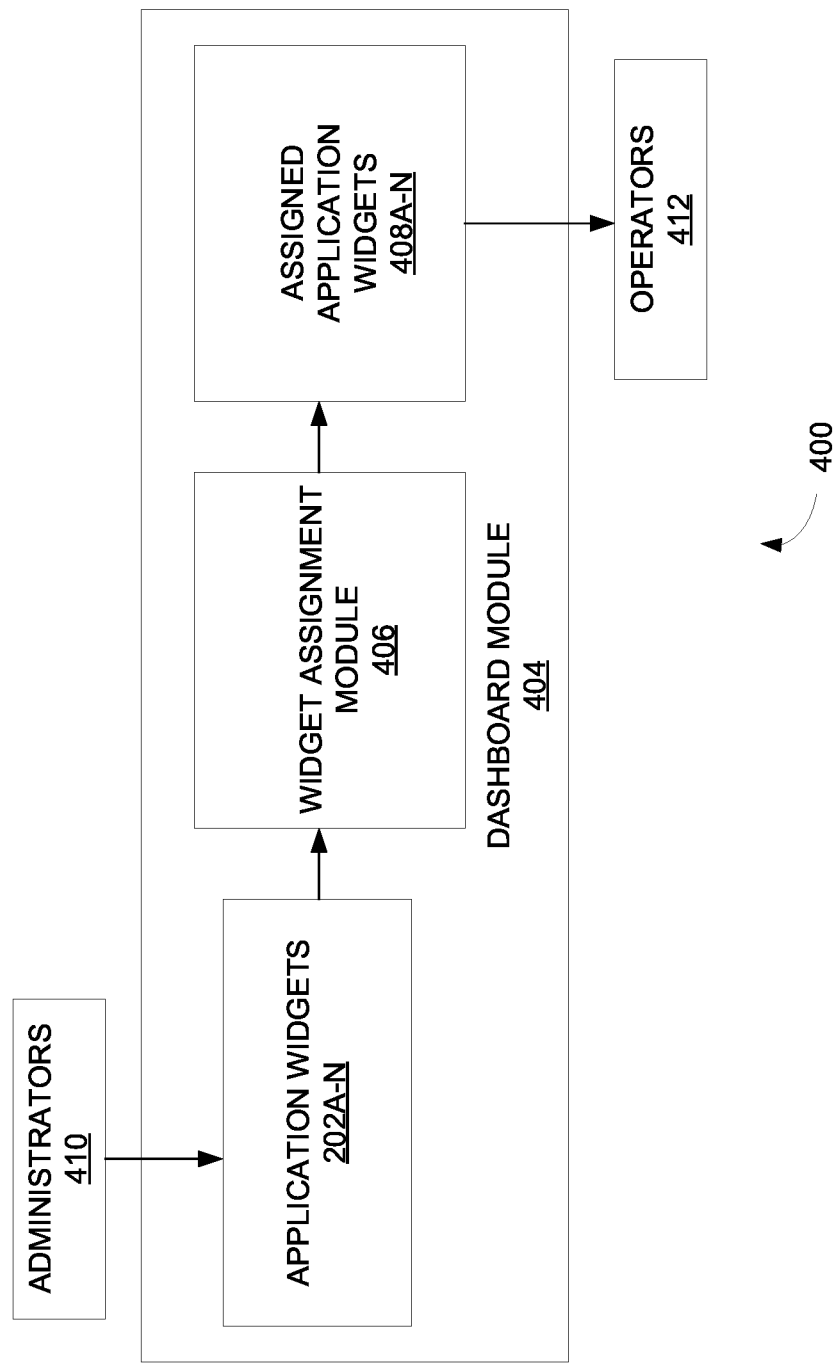
FIG. 4 illustrates an exemplary block diagram of a system for enabling dynamic regrouping of icons on a graphical user interface without requiring a reconfiguration according to an embodiment herein.

FIG. 4 illustrates an exemplary block diagram of a system 400 for enabling dynamic regrouping of icons on a graphical user interface without requiring a reconfiguration according to an embodiment herein. The system 400 includes a dashboard module 404 that includes the one or more application widgets 202A-N, a widget assignment module 406 and assigned application widgets 408A-N. In some embodiments, administrators 410 and operators 412 are enabled to perform one or more actions on the dashboard module 404. In some embodiments, the system 400 monitors and manages one or more application specific objects by performing (i) creation of one or more application widgets 202A-N with templates and (ii) re-grouping of application specific objects in the one or more application widgets 202A-N automatically.

In some embodiments, the application specific objects are added to the one or more application widgets 202A-N by (i) adding application specific objects manually into the one or more application widgets 202A-N, (ii) tagging a resource to the one or more application widgets 202A-N, and (iii) adding application specific objects with a regular expression (regex). The resource is an entity where all the application specific objects are already grouped and assigned to operators. Tagging the resource to the one or more application widgets 202A-N adds all the application specific objects within the resource into the one or more application widgets 202A-N. In some embodiments, any changes to the resource are automatically reflected in the one or more application widgets 202A-N. In some embodiments, a user may provide a regex and add objects to the one or more application widgets 202A-N. In some embodiments, the regex identifies if a new application object is discovered and if the new application object matches the regex, thereby automatically adding the new application object to the widget.

The system 400 simplifies widget creation where the administrators 410 need not spend more time in setting up application widgets for the operators 412 to use. The system 400 automatically detects any changes to application objects and the changes are reflected in already created application widgets. The system 400 eliminates the need of network administrators to re-configure the application dashboards that are assigned to the operators 412. In some embodiments, when any new templates are required, the user adds a JSON denoting a new template and the system 400 shows the new template, and all operations are done with the new template. By just adding minimal inputs, the application widget creation is simplified and by selecting the template, the grouping of applications within the widget is automatically performed. The users need not create multiple groups and add applications into the group separately. By creating widgets with resources, administrators 410 need not worry about adding or removing applications to the widget.

Figure 5:
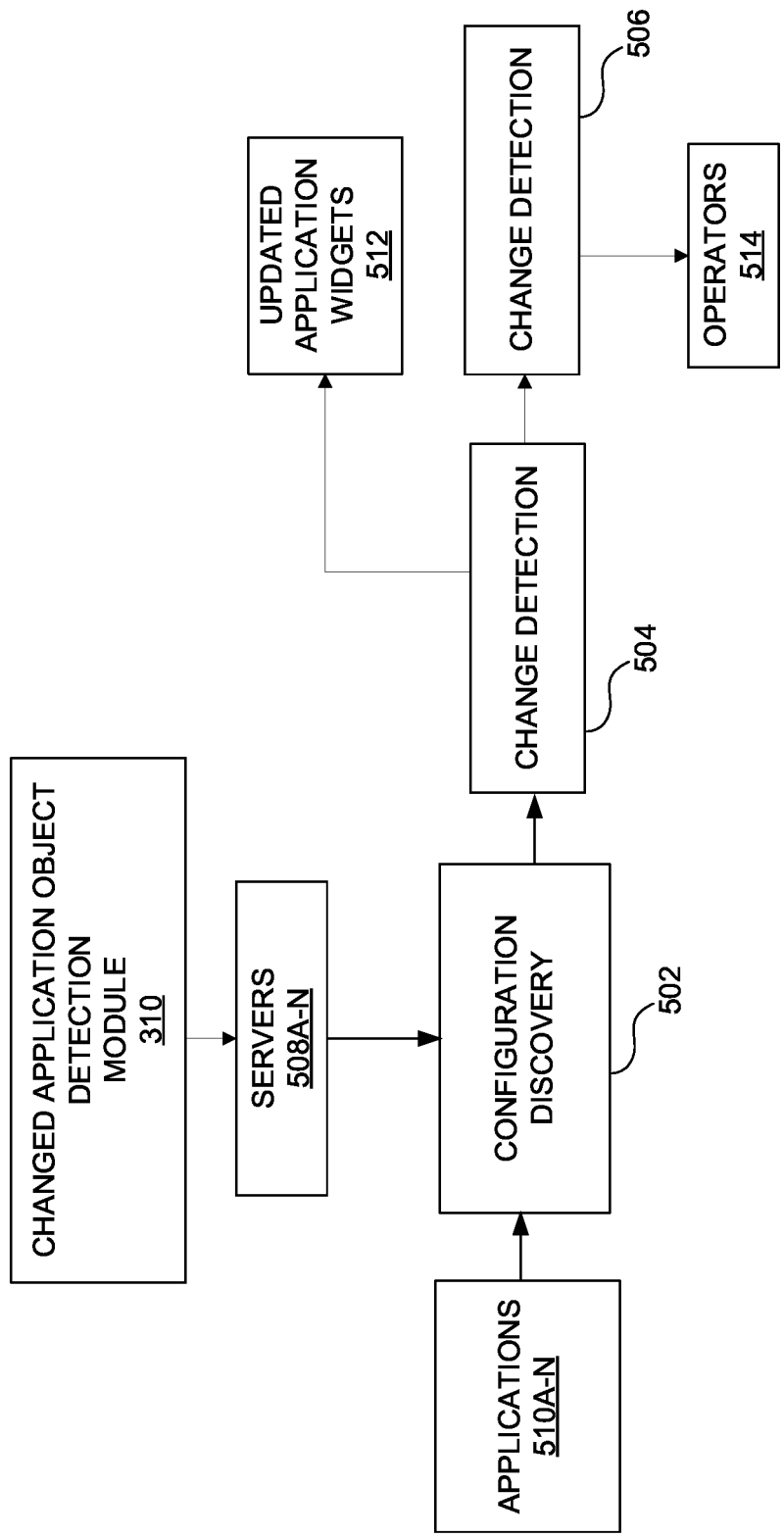
FIG. 5 illustrates an exemplary process diagram of a changed application object detection module of the application object regrouping server of FIG. 2 according to an embodiment herein.

FIG. 5 illustrates an exemplary process diagram of the changed application object detection module 310 of the application object regrouping server 208 of FIG. 2 according to an embodiment herein. At a step 502, configurations of applications 510A-N are identified in the application widgets. At a step 504, the changes made on the one or more application specific objects and newly added application specific objects are detected automatically. The changed application detection module 310 is communicatively connected with servers 508A-N to identify the changes in applications 510A-N. At a step 506, application widgets are updated with the detected changes and updated application widgets 512 are assigned to respective operators 514.

Figure 6A:
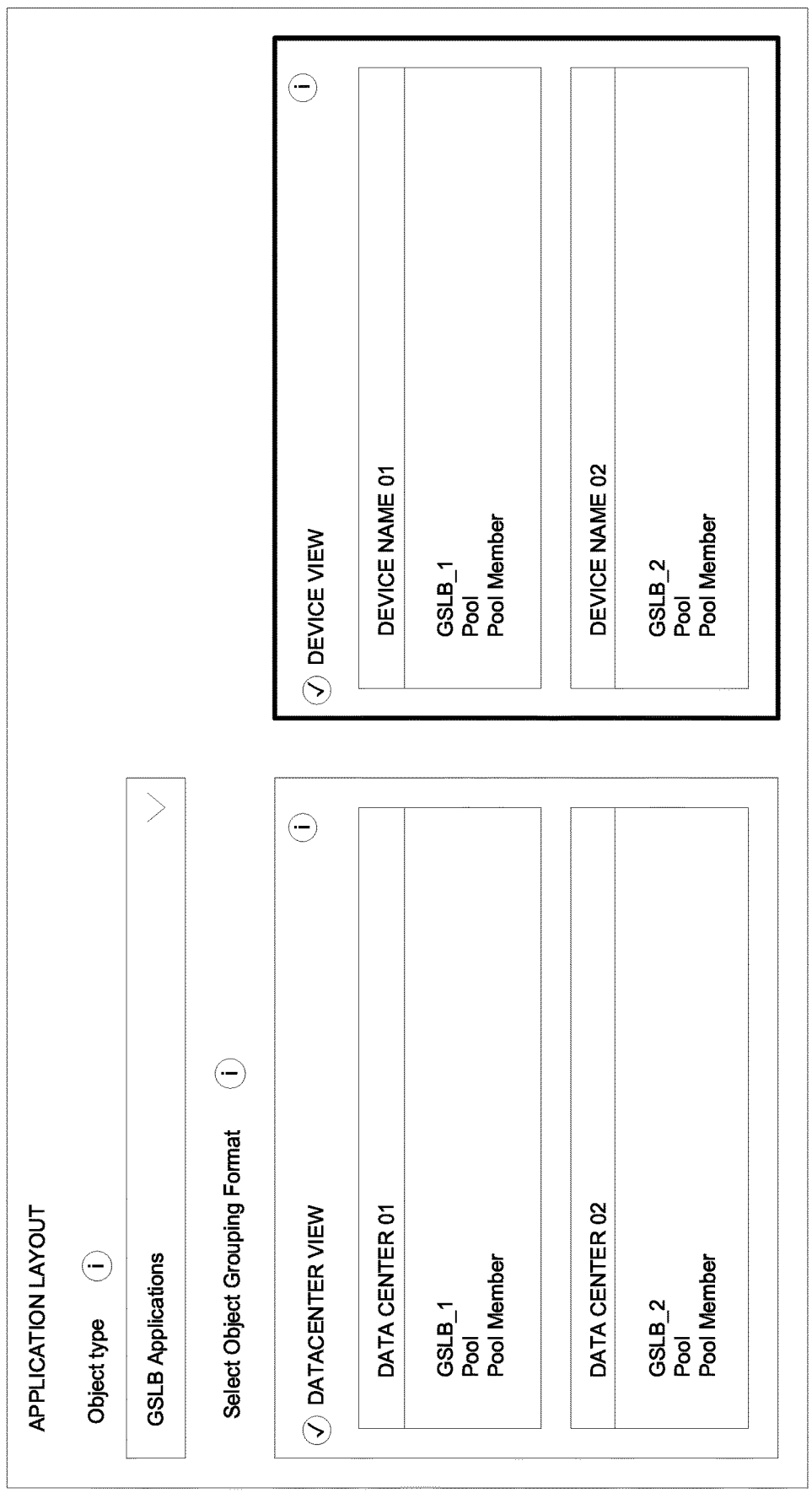

FIGS. 6A and 6B illustrate user interfaces of selecting widget layout and adding applications manually to a selected widget respectively according to an embodiment herein. In some embodiments, the administrators create the application widgets with one or more application specific objects and group the application widgets into different application dashboards. In some embodiments, the dashboards are created and assigned to the operators.

Figure 7B:
Figure 9A:
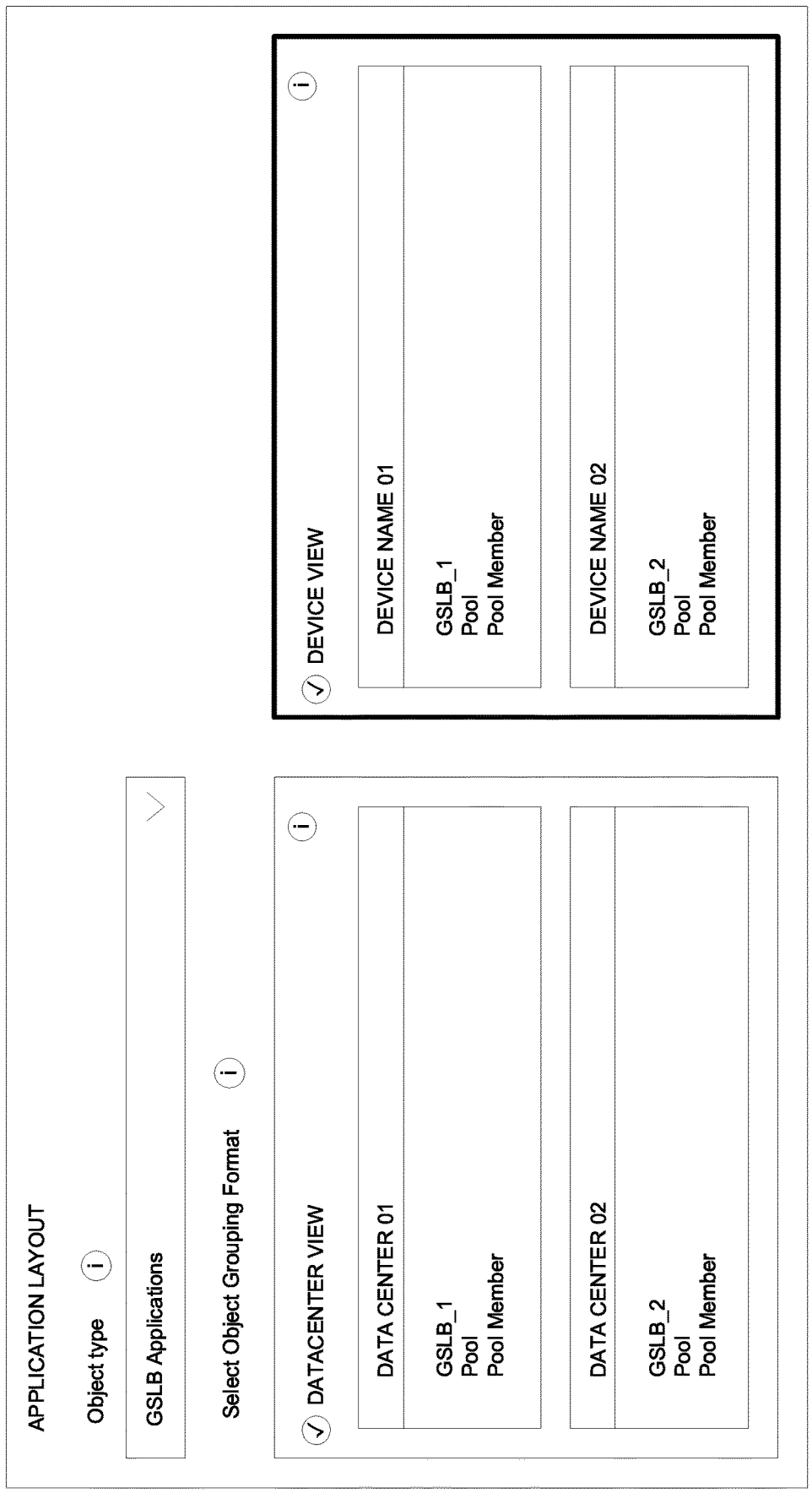
Figure 9B:

FIGS. 7A and 7B illustrate user interfaces of adding widgets by tagging a resource according to an embodiment herein. In some embodiments, when the application objects are created from a selected resource, the application objects are added to an application widget and grouped according to a selected template.

FIG. 8 illustrates a user interface of grouping application-specific objects based on data centers according to an embodiment herein. Once an application widget is created, the user is enabled to view the application widget in a different template by changing the template of the application widget. In some embodiments, when changing the template of the application widget, all the applications specific objects within the application widget are grouped according to the new template selected.

FIGS. 9A-9D illustrate user interfaces of changing template and grouping application specific objects according to an embodiment herein. In some embodiments, the application widgets are created by selecting different attributes of the application objects, for example, a vendor attribute, a device status of application objects attribute. In some embodiments, the selection of attributes is limited to filter or restrict devices and object types.

Figure 10:
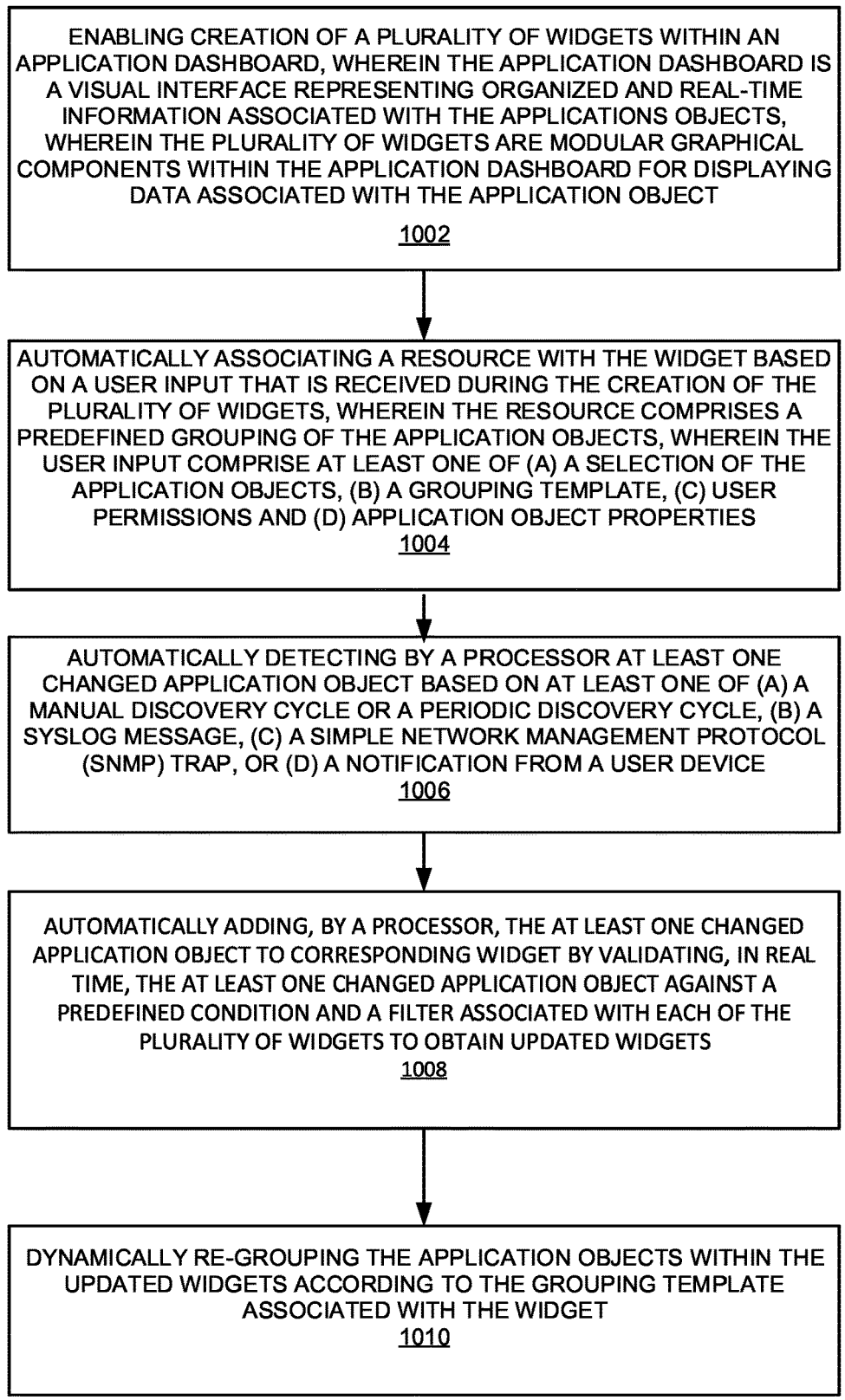
FIG. 10 is a flow diagram illustrating a computer-implemented method of enabling dynamic regrouping of icons on a graphical user interface without requiring a reconfiguration according to an embodiment herein.

FIG. 10 is a flow diagram illustrating a computer-implemented method of enabling dynamic regrouping of icons on a graphical user interface without requiring a reconfiguration according to an embodiment herein. At step 1002, a plurality of application widgets within an application dashboard are created. The application dashboard is a visual interface representing organized and real-time information associated with the application objects. The plurality of application widgets are modular graphical components within the application dashboard for displaying data associated with the application objects. At step 1004, a resource is associated automatically with the widget based on a user input that is received during the creation of the plurality of application widgets. The resource comprises a predefined grouping of the application objects. The user input comprises at least one of (a) a selection of the application objects, (b) a grouping template, (c) user permissions and (d) properties of the application objects. At step 1006, at least one changed application object is detected automatically by a processor of an application object regrouping server 208, based on at least one of (a) a manual discovery cycle or a periodic discovery cycle, (b) a syslog message, (c) a simple network management protocol (SNMP) trap, or (d) a notification from a user device. At step 1008, the at least one changed application object is automatically added, by a processor to the corresponding widget by validating, in real time, the at least one changed application object against a predefined condition and a filter associated with each of the plurality of application widgets to obtain updated widgets. At 1010, the application objects within the updated widgets are re-grouped according to the grouping template associated with each of the plurality of application widgets.

The method is of advantage that the method enables a reduction in computational complexity because of the at least one application object being dynamically managed. Traditionally, dynamic management of application objects requires continuous heavy computation as data quickly becomes obsolete. However, the method enables changing the widget grouping format by just changing the grouping template and without requiring reconfiguration of the at least one application widget. The method allows quick adjustment of presentation of the at least one application widget on the GUI based on evolving requirements or preferences without undergoing a time-consuming reconfiguration process. The method streamlines the customization of the GUI, thereby saving time and maintaining an ability to respond to changes automatically and promptly in application structure or user needs.

Further, the method enables real-time validation of the at least one changed application objects with corresponding application widgets for obtaining updated application widgets, which ensures that users see the most current and accurate information reflected in the widgets on the GUI. Real-time validation helps maintain data integrity, reduces the risk of displaying outdated information, and allows for swift adaptation to changes in the application. The method is advantageous in a dynamic environment, where timely and accurate data presentation is crucial for decision-making and user interaction.

Figure 11:
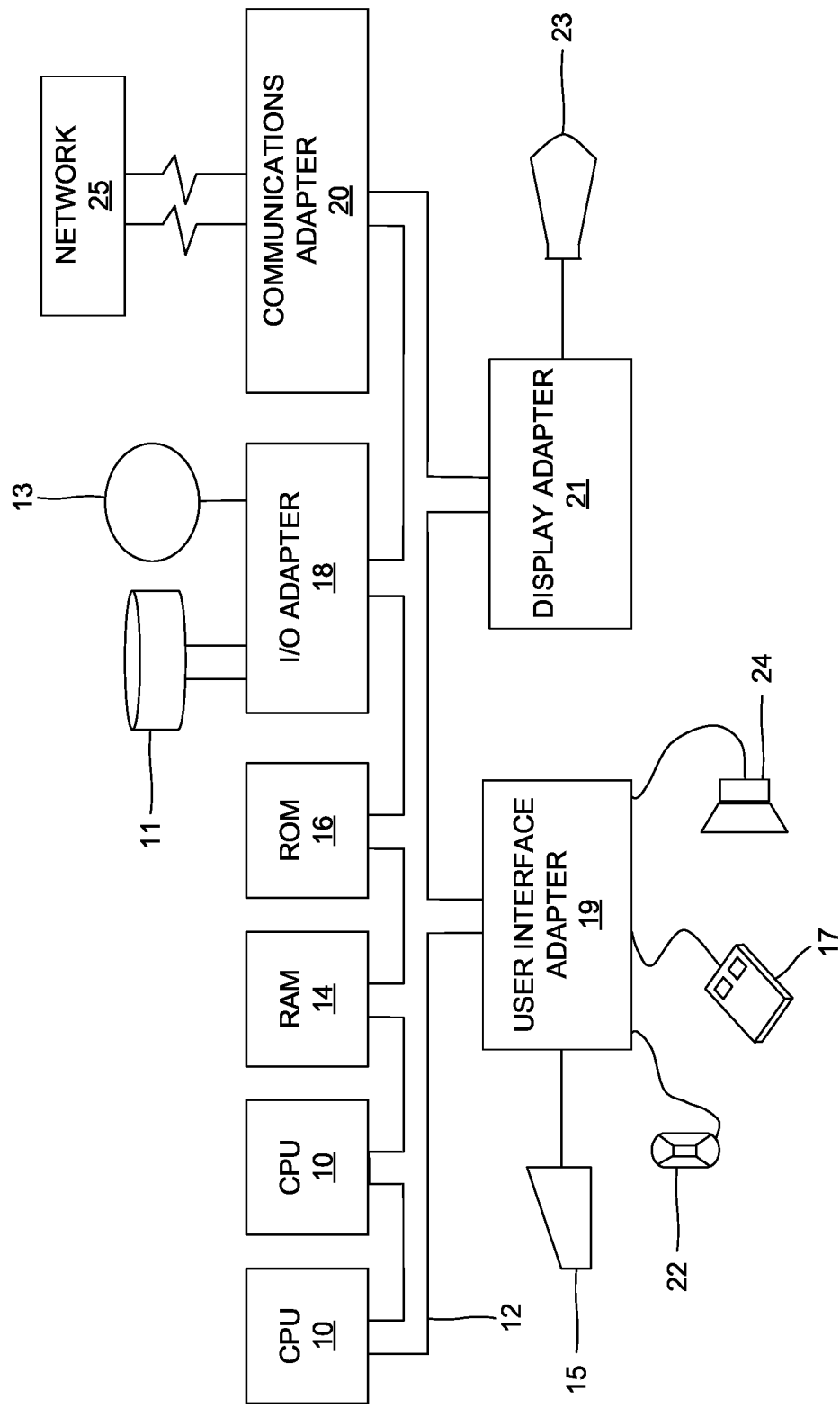
FIG. 11 illustrates a schematic view of a hardware configuration of device management/computer architecture according to an embodiment herein.

A representative hardware environment for practicing the embodiments herein is depicted in FIG. 11. FIG. 11 illustrates a schematic view of a hardware configuration of device management/computer architecture according to an embodiment herein. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random-access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A processor-implemented method for enabling dynamic regrouping of icons on a graphical user interface without requiring a reconfiguration, the method comprising:
   enabling creation of a plurality of application widgets within an application dashboard, wherein the application dashboard is a visual interface representing organized and real-time information associated with applications objects, wherein the plurality of application widgets are modular graphical components within the application dashboard for displaying data associated with the application objects;

automatically associating a resource with each of the plurality of application widgets based on a user input that is received during the creation of the plurality of application widgets, wherein the resource comprises a predefined grouping of the application objects, wherein the user input comprises at least one of (a) a selection of the application objects, (b) a grouping template, (c) user permissions or (d) properties of the application objects;

automatically detecting, by a processor, at least one changed application object based on at least one of (a) a manual discovery cycle or a periodic discovery cycle, (b) a syslog message, (c) a simple network management protocol (SNMP)trap, or (d) a notification from a user device;

automatically adding, by the processor, the at least one changed application object to corresponding widget by validating, in real time, the at least one changed application object against a predefined condition and a filter associated with each of the plurality of application widgets to obtain updated widgets; and dynamically re-grouping the application objects within the updated widgets according to the grouping template associated with each of the plurality of application widgets.

2. The processor-implemented method of claim 1, further comprising displaying the dynamically re-grouped application objects within the updated widgets on the application dashboard.

3. The processor-implemented method of claim 2, wherein the step of automatically adding the at least one changed application object to corresponding widget to obtain updated widgets includes matching a new application object with a regular expression and adding matching application objects to the corresponding widget.

4. The processor-implemented method of claim 1, wherein the predefined condition and the filter associated with each of the plurality of application widgets includes at least one of an application object vendor, a device type, a device status, or at least one application property.

5. The processor-implemented method of claim 1, further enabling an interactive modification of grouping template of the plurality of application widgets without requiring widget reconfiguration.

6. A system for enabling dynamic regrouping of icons on a graphical user interface without requiring a reconfiguration, comprising:
a memory that stores a set of instructions; and
a processor that is configured to execute the set of instructions to perform:
enabling creation of a plurality of application widgets within an application dashboard, wherein the application dashboard is a visual interface representing organized and real-time information associated with applications objects, wherein the plurality of application widgets are modular graphical components within the application dashboard for displaying data associated with the application objects;

automatically associating a resource with each of the plurality of application widgets based on a user input that is received during the creation of the plurality of application widgets, wherein the resource comprises a predefined grouping of the application objects, wherein the user input comprises at least one of (a) a selection of the application objects, (b) a grouping template, (c) user permissions or (d) properties of the application objects;

automatically detecting, by a processor, at least one changed application object based on at least one of (a) a manual discovery cycle or a periodic discovery cycle, (b) a syslog message, (c) a simple network management protocol (SNMP) trap, or (d) a notification from a user device;

automatically adding, by the processor, the at least one changed application object to corresponding widget by validating, in real time, the at least one changed application object against a predefined condition and a filter associated with each of the plurality of application widgets to obtain updated widgets; and dynamically re-grouping the application objects within the updated widgets according to the grouping template associated with each of the plurality of application widgets.

7. The system of claim 6, wherein the processor displays the dynamically re-grouped application objects within the updated widgets on the application dashboard.

8. The system of claim 6, wherein the processor automatically adds the at least one changed application object to corresponding widget to obtain updated widgets by matching a new application object with a regular expression and adding matching application objects to the corresponding widget.

9. The system of claim 6, wherein the predefined condition and the filter associated with each of the plurality of application widgets includes at least one of an application object vendor, a device type, a device status, or at least one application property.

10. The system of claim 6, wherein the processor further enables an interactive modification of grouping template of the plurality of application widgets without requiring widget reconfiguration.

11. A non-transitory computer-readable storage medium storing a sequence of instructions, which when executed by one or more processors, causes dynamically enabling dynamic regrouping of icons on a graphical user interface without requiring a reconfiguration, comprising:
enabling creation of a plurality of application widgets within an application dashboard, wherein the application dashboard is a visual interface representing organized and real-time information associated with applications objects, wherein the plurality of application widgets are modular graphical components within the application dashboard for displaying data associated with the application objects;

automatically associating a resource with each of the plurality of application widgets based on a user input that is received during the creation of the plurality of application widgets, wherein the resource comprises a predefined grouping of the application objects, wherein the user input comprises at least one of (a) a selection of the application objects, (b) a grouping template, (c) user permissions or (d) properties of the application objects;

automatically detecting, by a processor, at least one changed application object based on at least one of (a) a manual discovery cycle or a periodic discovery cycle, (b) a syslog message, (c) a simple network management protocol (SNMP) trap, or (d) a notification from a user device;

automatically adding, by the processor, the at least one changed application object to corresponding widget by validating, in real time, the at least one changed application object against a predefined condition and a filter associated with each of the plurality of application widgets to obtain updated widgets; and dynamically re-grouping the application objects within the updated widgets according to the grouping template associated with each of the plurality of application widgets.

12. The non-transitory computer readable storage medium storing a sequence of instructions of claim 11, further comprising displaying the dynamically re-grouped application objects within the updated widgets on the application dashboard.

13. The non-transitory computer readable storage medium storing a sequence of instructions of claim 11, wherein the step of automatically adding the at least one changed application object to corresponding widget to obtain updated widgets includes matching a new application object with a regular expression and adding matching application objects to the corresponding widget.

14. The non-transitory computer readable storage medium storing a sequence of instructions of claim 11, wherein the predefined condition and the filter associated with each of the plurality of application widgets includes at least one of an application object vendor, a device type, a device status, and at least one application property.

15. The non-transitory computer readable storage medium storing a sequence of instructions of claim 11, further comprising enabling an interactive modification of grouping template of the plurality of application widgets without requiring widget reconfiguration.

* * * * *